United States Patent [19]
Childers

[11] Patent Number: 5,949,981
[45] Date of Patent: Sep. 7, 1999

[54] DEADLOCK AVOIDANCE IN A BRIDGE BETWEEN A SPLIT TRANSACTION BUS AND A SINGLE ENVELOPE BUS

[75] Inventor: Brian Alan Childers, Santa Clara, Calif.

[73] Assignee: Apple Computer, Inc., Cupertino, Calif.

[21] Appl. No.: 08/888,113

[22] Filed: Jul. 3, 1997

Related U.S. Application Data

[63] Continuation of application No. 08/432,621, May 2, 1995, abandoned.

[51] Int. Cl.$^6$ ............................................. G06F 13/00
[52] U.S. Cl. ............................... 395/309; 395/308; 395/287
[58] Field of Search .......................... 395/306–309, 395/287

[56] References Cited

U.S. PATENT DOCUMENTS

| | | | |
|---|---|---|---|
| 4,494,193 | 1/1985 | Brahm et al. | 395/200.06 |
| 5,278,974 | 1/1994 | Lemmon et al. | 395/550 |
| 5,305,442 | 4/1994 | Pedersen et al. | 395/290 |
| 5,345,562 | 9/1994 | Chen | 395/275 |
| 5,355,455 | 10/1994 | Hilgendorf et al. | 395/306 |
| 5,363,485 | 11/1994 | Nguyen et al. | 395/250 |
| 5,418,914 | 5/1995 | Heil et al. | 395/293 |
| 5,469,435 | 11/1995 | Krein et al. | 370/85.2 |
| 5,546,546 | 8/1996 | Bell et al. | 395/292 |

FOREIGN PATENT DOCUMENTS

9532475  11/1995  WIPO.

*Primary Examiner*—Meng-Ai T. An
*Assistant Examiner*—Sumati Lefkowitz
*Attorney, Agent, or Firm*—Burns, Doane, Swecker & Mathis, L.L.P.

[57] ABSTRACT

A mechanism is provided for avoiding deadlock, in particular, a Read/Read deadlock, in a computer system in which a split-transaction bus is bridged to a single-envelope bus. In one embodiment, deadlock is avoided using a closely-coupled master and slave circuit on the split-response bus. The closely-coupled master and slave circuit operates to disallow a second deadlocking read transaction. While there is an outstanding read transaction in either the master or slave portions of the split-response bus interface, the other portion will refuse to accept, or retry, another potentially deadlocking read transaction. The invention has the advantage of being absolutely certain of avoiding the Read/Read deadlock condition with a minimum amount of circuit complexity.

8 Claims, 6 Drawing Sheets

DEADLOCK AVOIDANCE IN A BRIDGE BETWEEN A SPLIT TRANSACTION BUS AND A SINGLE ENVELOPE BUS

This application is a continuation of application Ser. No. 08/432,621, filed May 2, 1995, now abandoned.

BACKGROUND OF THE INVENTION

1. Field of the Invention

The present invention relates to computer architecture, in particular to deadlock avoidance in a computer system.

2. State of the Art

The PowerPC computer architecture, co-developed by Apple Computer, represents a departure from prior-generation small computer architectures. Prior-generation small computer architectures have generally been based on what is commonly known as a single-envelope bus. For a single-envelope bus, the address and data portions of the bus transaction are applied together during a given bus cycle. An example of a single-envelope bus is the PCI bus.

PowerPC machines currently sold by Apple are based largely on the Motorola MPC601 RISC microprocessor. Other related processors, including the MPC 604, MPC 603, MPC 603e, and MPC 602 are currently available and additional related processors including the MPC 620 will be readily available in the future. The MPC60x permits separate address bus tenures and data bus tenures, where tenure is defined as the period of bus mastership. In other words, rather than considering the system bus as an indivisible resource and arbitrating for access to the entire bus, the address and data buses are considered as separate resources, and arbitration for access to these two buses may be performed independently. A transaction, or complete exchange between two bus devices, is minimally comprised of an address tenure; one or more data tenures may also be involved in an exchange. There are two kinds of transactions: address/data and address-only.

A tenure, whether address or data, consists of three phases: arbitration, transfer, and termination. During address termination, a signal AACK_ occurs that marks the end of the address tenure and that is used to acknowledge the transfer of an address. During data termination, a signal TA_ occurs that marks the end of the data tenure and that is used to acknowledge the transfer of a data beat. A beat corresponds generally to a particular state of the address bus or the data bus. Transfers include both single-beat transfers, in which a single beat is transferred, and burst data transfers, in which a burst of four data beats is transferred.

Figure 1:
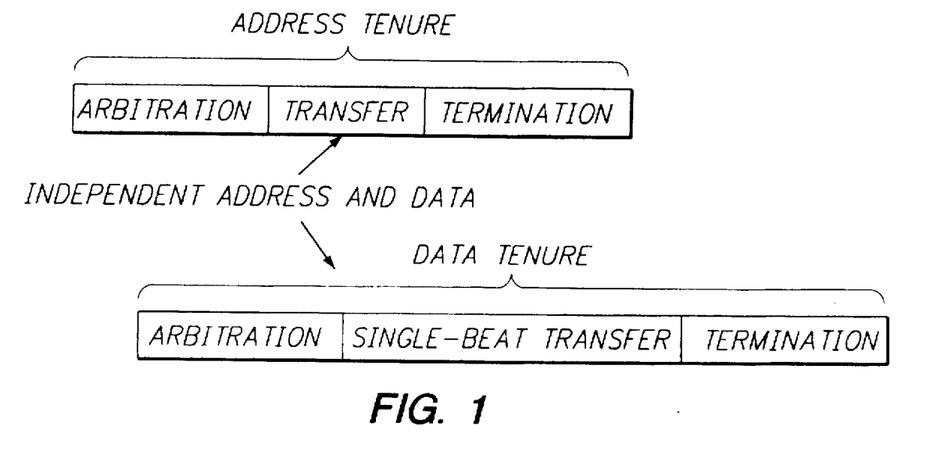
FIG. 1 is a diagram illustrating overlapping tenures for a single-beat transfer on a conventional MPC601 bus.

Referring more particularly to FIG. 1, note that the address and data tenures are distinct from one another and that both consist of three phases—arbitration, transfer, and termination. FIG. 1 shows a data transfer that consists of a single-beat transfer (up to 64 bits). In a four-beat burst transfer, by contrast, data termination signals are required for each beat of data, but re-arbitration is not required. Having independent address and data tenures allows address pipelining (indicated in FIG. 1 by the fact that the data tenure begins before the address tenure ends) and split-bus transactions to be implemented at the system level in multi-processor systems. Address pipelining allows new address bus transactions to begin before the current data bus transaction has finished by overlapping the data bus tenure associated with a previous address bus tenure with one or more successive address tenures. Split-bus transaction capability allows the address bus and data bus to have different masters at the same time.

For clarity, the basic functions of address and data tenures will be discussed in somewhat greater detail.

In the case of address tenure, during address arbitration, address bus arbitration signals are used to gain mastership of the address bus. Assuming the CPU to be the bus master, it then transfers the address on the address bus during the address transfer phase. The address signals, together with certain transfer attribute signals discussed in greater detail hereinafter, control the address transfer. After the address transfer phase, the system uses the address termination phase to signal that the address tenure is complete or that it must be repeated.

In the case of data tenure, during address arbitration, the CPU arbitrates for mastership of the data bus. After the CPU is the bus master, during the data transfer phase, it samples the data bus for read operations or drives the data bus for write operations. Data termination signals occur in the data termination phase. Data termination signals are required after each data beat in a data transfer. In a single-beat-transaction, the data termination signals also indicates the end of the tenure, while in burst accesses, the data termination signals apply to individual beats and indicate the end of the tenure only after the final data beat.

Address-only transfers use only the address bus, with no data transfer involved. This feature is particularly useful in multi-master and multiprocessor environments, where external control of on-chip primary caches and TLB (translation look-aside buffer) entries is desirable. Additionally, the MPC60x provides a retry capability that supports an efficient "snooping" protocol for systems with multiple memory systems (including caches) that must remain coherent.

Pipelining and split-bus transactions, while they do not inherently reduce memory latency, can greatly improve effective bus-memory throughput. The MPC60x bus protocol does not constrain the maximum number of levels of pipe-lining that can occur on the bus between multiple masters. In a system in which multiple devices must compete for the system bus, external arbitration is required. The external arbiter must control the pipeline depth and synchronization between masters and slaves.

In a traditional pipelined implementation, data bus tenures are kept in strict order with respect to address tenures. However, external hardware can further decouple the address and data buses, allowing the data tenures to occur out of order with respect to the address tenures. Second-generation PowerPC computers include computers whose architecture was especially designed for high performance and that incorporated such hardware. This architecture supports true split-bus operation with ordered slaves and ordered masters. "Ordered" means each master and each slave has its own independent FIFO structure supporting "ordered" service to transactions posted to it. If a slave receives three transactions A, B, and C, then it will respond to A first, B second, and C third. If a master performs transactions D, E, and F, then it expects servicing of those transactions in the order of D first, E second, and F third. There can be up to some number of outstanding master/slave pair transactions in the architecture at one time. In an exemplary embodiment, there can be up to three outstanding master/slave pair transactions in the architecture at one time. As a result, in the foregoing architecture, a bridge, such as a video bridge, may concurrently have one outstanding slave transaction to it and one outstanding master transaction from it. Although ordered masters and slaves, as opposed to unordered masters and slaves, provide an overall simplification to system architecture, they can lead to deadlocks when there are conflicting completion dependencies.

3

Deadlock occurs in a system when one resource cannot complete an access to another resource, and the access blocks other resources from performing transactions on the bus. In the case of a bridge between a split bus and a single-envelope bus (such as the ARBus and the PCI bus), since the different buses are referenced to different clock signals of different frequencies and phases, transactions that pass from one side of the bus bridge to the other must pass an asynchronous boundary. An attempt to avoid deadlock by passing information across this boundary will lead to some uncertainty, such that not all deadlocks can be reliably avoided using such a technique.

SUMMARY OF THE INVENTION

The present invention, generally speaking, provides a mechanism for avoiding deadlock, in particular, a Read/Read deadlock, in a computer system in which a split-transaction bus is bridged to a single-envelope bus. In one embodiment, deadlock is avoided using a closely-coupled master and slave circuit on the split-response bus. The closely-coupled master and slave circuit operates to disallow a second deadlocking read transaction. While there is an outstanding read transaction in either the master or slave portions of the split-response bus interface, the other portion will refuse to accept, or retry, another potentially deadlocking read transaction. The invention has the advantage of being absolutely certain of avoiding the Read/Read deadlock condition with a minimum amount of circuit complexity.

BRIEF DESCRIPTION OF THE DRAWING

The present invention may be further understood from the following description in conjunction with the appended drawing. In the drawing.

DETAILED DESCRIPTION OF THE PREFERRED EMBODIMENTS

Figure 2:
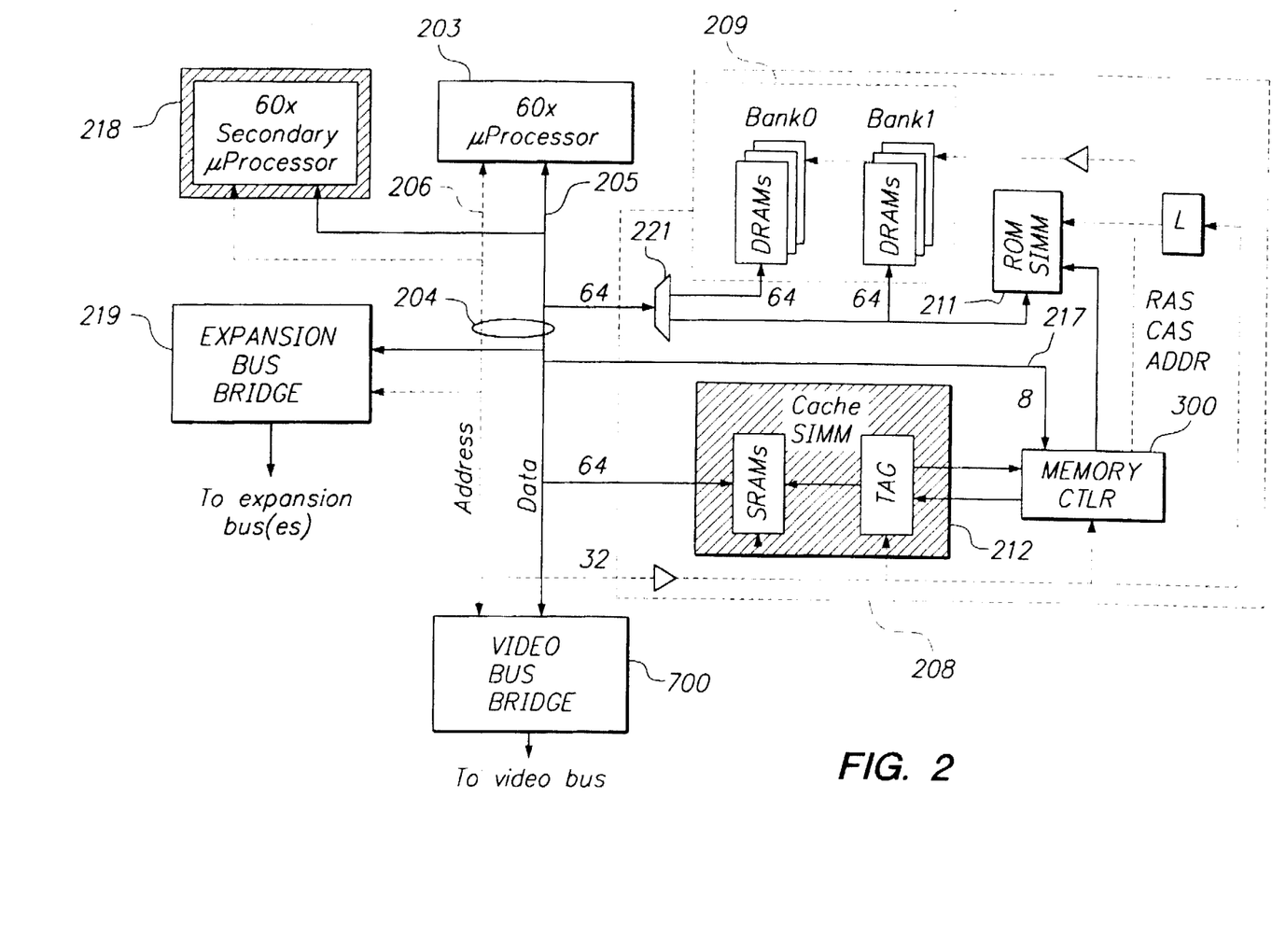
FIG. 2 is a system-level block diagram of a computer system in which the present invention may be used.

Referring now to FIG. 2, the present invention may be used in a computer system of the type shown. A CPU 203 (for example a Power PC 601 microprocessor) is connected to a system bus 204, including a data bus 205, an address bus 206, and a control bus (not shown). A memory subsystem 208 includes, in the illustrated embodiment, a main memory 209, a read-only memory 211, and a level-two cache memory 212. The data processor 203, through the system bus 204, is connected directly to the level-two cache memory 212. The data processor 203 is connected indirectly to the main memory 209 and, the read-only memory 211, through a datapath circuit 221 and a memory controller 300. In general, the datapath circuit 221 provides for 32- or 64-bit reads from and writes to memory, in either big-endian or little-endian mode. The memory controller 300 controls the various memory devices within the memory subsystem 208 in response to signals on the system bus 204 and, in particular, provides address and control signals (i.e., RAS and CAS) to the main memory 209. A register data bus 217 is connected to a portion of the data bus 205.

Also shown is an optional secondary processor 218 which, like the CPU 203, may be a Power PC 601 microprocessor for example.

The system bus 204 is also connected to an expansion bus bridge 219 (possibly more than one) and, optionally, a video bus bridge 700. In a preferred embodiment, the system bus 204 is a superset of the conventional Power PC 601 microprocessor interface referred to herein as the ARBus. An expansion bus connected to the expansion bus bridge 219 may be a standard PCI bus. Likewise, a video bus connected to the video bus bridge 700 may be a PCI-like bus.

Figure 3:
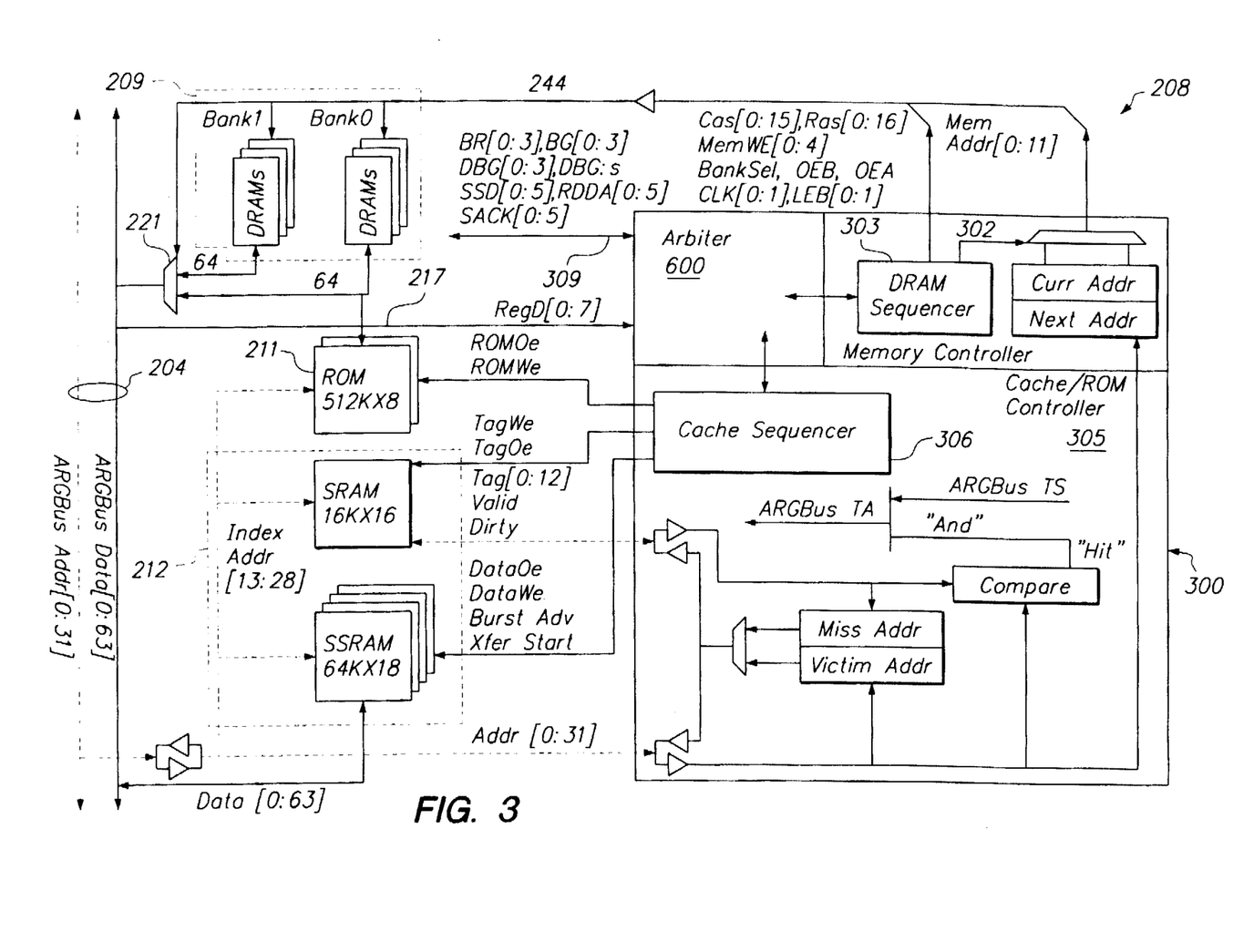
FIG. 3 is a block diagram of the memory controller 300 of FIG. 2.

Referring to FIG. 3, the memory subsystem 208 including the memory controller 300 of FIG. 2 are shown in greater detail, with particular emphasis on the various signals input to and output from the memory controller 300. The memory controller 300 includes a main memory controller 302, a cache/ROM controller 305, and an arbiter 600. The main memory controller 302 produces address and control signals for the main memory 209 and includes a DRAM sequencer 303 and certain memory address logic. The cache/ROM controller 305 produces control signals for the level-two cache memory 212 and the read-only memory 211 and includes a cache/ROM sequencer 306 and certain cache logic. Both the main memory controller 302 and the cache/ROM controller 305 exchange control signals with the arbiter 600, which executes overall control of the memory controller 300 and which is more particularly the subject of the following description.

The arbiter 600 includes a register file (not shown) that may be written and read by the data processor 203 across the register data bus 217. The register file includes, in addition to numerous base address registers, various ED, configuration and timing registers. The particulars of these registers are not essential to an understanding of the present invention and will not be further described. The arbiter 600 inputs various control signals from and outputs various control signals to a control bus 309. Some of the control signals carried by the control bus 309 are part of the conventional PowerPC 601 microprocessor interface. The majority of the signals carried by the control bus 309, however, are side-band information signals used to independently control the address bus 206 and the data bus 205.

Prior to describing in detail the manner in which these side-band information signals are used to decouple the address bus 206 and the data bus 205, it will be useful to consider what is termed herein conventional usage of the PowerPC 601 microprocessor interface.

Figure 4:
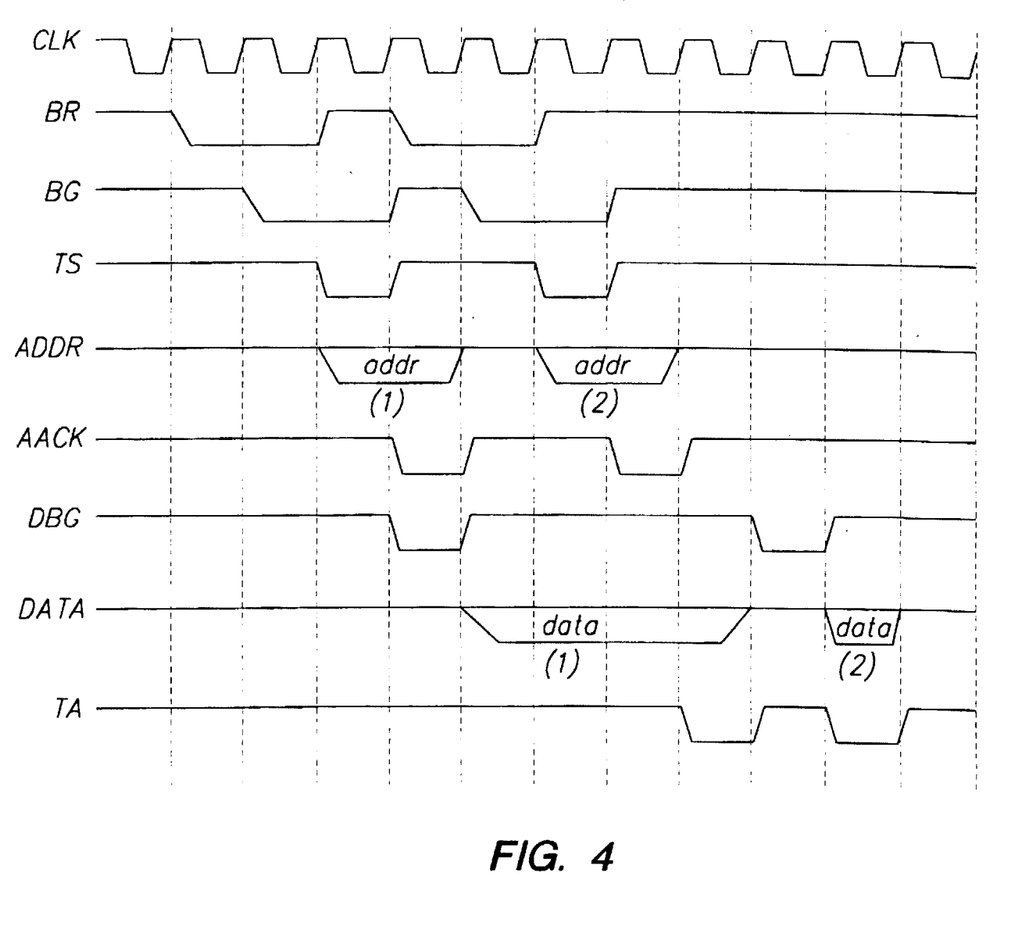
FIG. 4 is a timing diagram showing conventional usage of the MPC601 bus.

As shown in FIG. 1, address tenure and data tenure both have arbitration, transfer and termination phases. Each of these phases involves the exchange of respective handshaking signals. Referring to FIG. 4, the handshaking signals that characterize the address arbitration phase are a bus request signal BR and a bus grant signal BG. The bus request signal BR is an output signal of the CPU 203. The bus grant signal BG is an input signal of the CPU 203 and is output by the arbiter 600. Both the bus request signal BR and the bus grant signal BG relate to the address bus 206. When the CPU 203 has received the bus grant signal BG, it is free to enter the address transfer phase.

During the address transfer phase, a transfer start signal TS is asserted by the CPU 203 when the CPU 203 begins to drive the address bus 206. The address is decoded by a slave device as belonging to that address, i.e., falling within the device's assigned address space. During the address termination phase, the slave device asserts the address acknowledge signal AACK after it has sampled the address on the address bus 206.

During the address transfer phase, certain transfer attribute signals are used to indicate the nature of transaction, including whether the transaction is an address-only transaction. Assuming that the transaction is not, then the transfer start signal TS is treated by the arbiter 600 as an implicit data bus request, starting the data arbitration phase. Following assertion of the acknowledge signal AACK, a data bus grant signal DBG is asserted by the arbiter 600 once the data bus 205 is available for use by the CPU 203. The CPU 203 may then begin the data transfer phase on the next cycle by driving the data bus 205. During a subsequent data termination phase, the slave device asserts a transfer acknowledge signal TA after it has sampled the data on the data bus 205.

The foregoing sequence of operations is repeated for a second subsequent transaction. In FIG. 4, the transaction to which address and data information pertain is indicated in parentheses, i.e., transaction (1) and transaction (2).

Note that in FIG. 4, address tenures and data tenures, although they may be pipelined, are tightly ordered. That is, data bus tenure on the system is granted in the same order as address tenure is granted even if the address tenures are granted to different masters. In precise terms, if TS(n) is for Master A and TS(n+1) is for Master B, then DBG(n) will be for Master A and DBG(n+1) will be for Master B.

This tight ordering of the conventional MPC601 bus may result in considerable system performance degradation, especially as bus speed increases. A read transaction to an expansion-bus device, for example, will typically be high-latency as compared to a main-memory read transaction. Tight ordering of address and data tenures results in such latency impacting the data bus. That is, even though another transaction might be ready to use the data bus first, during the latency period, it cannot because of the tight ordering of address and data tenures. If a system is to handle information steams having real-time constraints, such as video streams, it is important to ensure that the data bus is not unavailable for use during substantial periods of time; otherwise real-time deadlines may be missed, resulting in objectional artifacts during presentation.

The architecture of the computer system of FIG. 2 decouples address and data tenures such that data bus utilization is increased. This increase in data bus utilization allows for higher real-time performance to be achieved. In particular, the present invention allows for a true split-bus architecture with ordered slaves and ordered masters. "Ordered," in one usage, means each master and each slave has its own independent FIFO structure supporting "ordered" service to transactions posted to it. If a slave receives three transactions A, B, and C, the it will respond to A first, B second, and C third. If a master performs transactions D, E, and F, then it expects servicing of those transactions in the order of D first, E second, and F third. In one embodiment, there can be up to three outstanding master/slave pair transactions at one time.

Referring briefly again to FIG. 3, the side-band information signals carried by the control bus 309 are side-band information signals used to decouple the address bus 206 and the data bus 205. These side-band information signals include, in addition to the bus request signal BR, the bus grant signal BG and the data bus grant signal DBG of FIG. 4, corresponding signal for each master besides the CPU 203.

In one embodiment, the system includes, besides the CPU 203, four additional masters for a total of up to five masters: the CPU 203, the secondary processor 218 (if present), the expansion bus bridge 219, one additional expansion bus bridge (if present), and the video bus bridge 700 (if present). The control bus 309 therefore carries five bus request signals BR|0:4|, five bus grant signals BG|0:4|, and five data bus grant signals DBG|0:4|.

In the same embodiment, the system includes six slaves: the expansion bus bridge 219 (also a master), the additional expansion bus bridge (also a master, if present), the video bus bridge 700 (also a master, if present), the main memory 209, the read-only memory 211, and memory controller registers accessible via the register data bus 217. For each slave, the control bus 309 carries three signals: a slave acknowledge signal SACK, a read data available signal RDDA, and a source- or sink-data signal SSD. The control bus 309 therefore carries six slave acknowledge signals SACK|0:5|, six read data available signals RDDA|0:5|, and six source- or sink-data signals SSD|0:5|.

Figure 5:
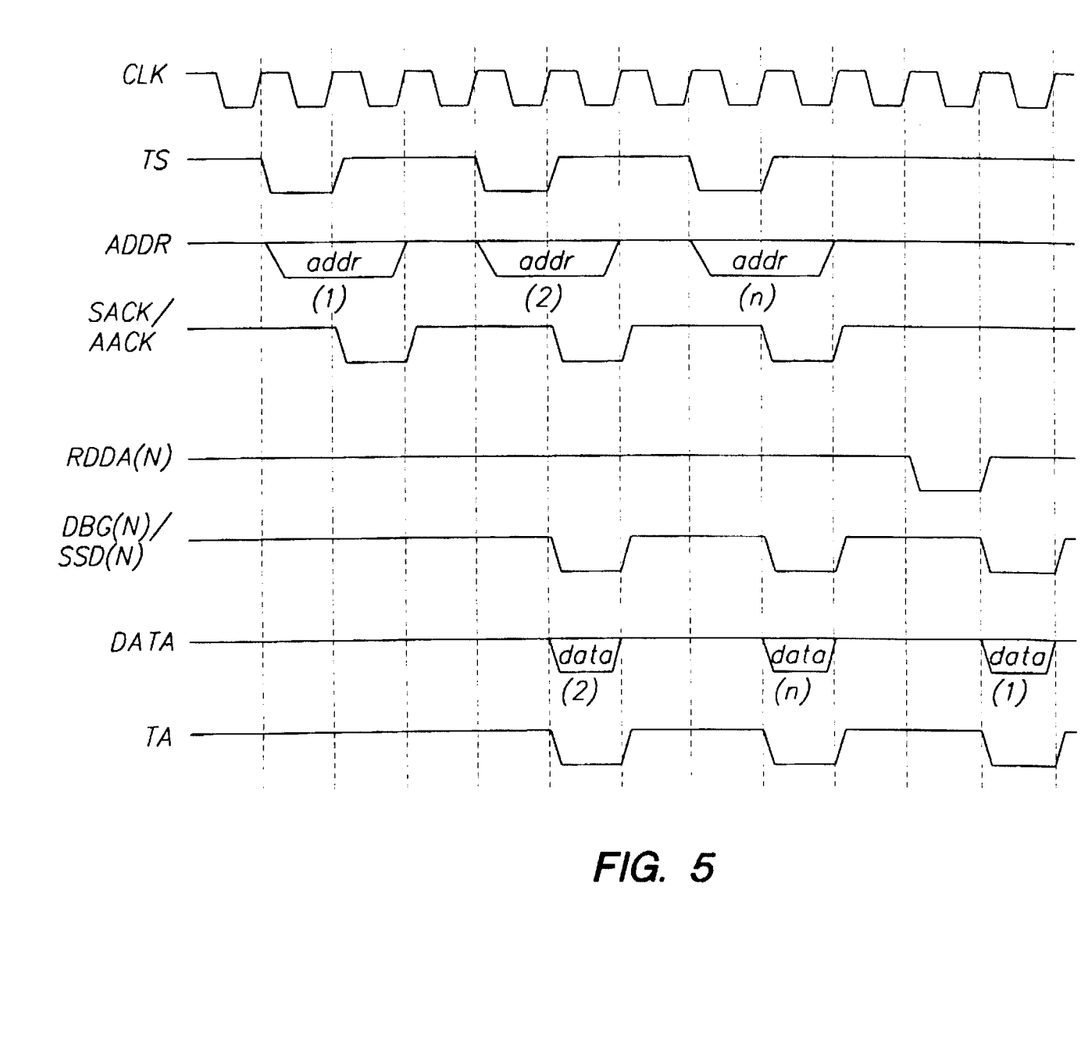
FIG. 5 is a timing diagram showing usage of the ARBus (a superset of the MPC601 bus) in the high-performance computer architecture of FIG. 2.

The manner in which the foregoing signals are used to decouple address tenures and data tenure may be appreciated with reference to FIG. 5. For simplicity, the address arbitration phase has not been illustrated. The address transfer phase is essentially the same as in the conventional case. The address termination phase, however, differs. The addressed slave asserts the AACK signal in the conventional manner, the AACK signal being used by the master. In parallel with AACK, the addressed slave generates a SACK signal for use by the arbiter 600. The arbiter uses this information about which slave has acknowledged in order to reorder transactions on the system bus 204.

In the data arbitration phase, the data bus is granted to masters based on a priority ordering of masters, and is granted to slaves based in part on the priority of the master of the transaction and in part on the availability of data from the slave. What may be considered in effect are two sets of grant signals therefore defined. DBG[0:#Masters-1] for masters and SSD|0:#Slaves-1| for slaves.

Assume, for example, that in FIG. 5 the first transaction is a read by the CPU 203 from the expansion bus bridge 219 and that the second and third transactions are writes to memory from the video bus bridge 700. In general, video transactions will be assigned a higher priority than transactions by the CPU 203 because of the real-time requirements of video transactions. Data bus grant signals are therefore issued to video bus bridge 700 for the first video transaction (2), which proceeds through the data transfer phase, and the second video transaction (n), which also proceeds through the data transfer phase. The CPU 203 will not be issued a data bus grant signal for its read from the expansion bus bridge 219 until a read data acknowledge signal has been returned to the arbiter 600 from the expansion bus bridge 219. Then, the CPU 203 will be issued a data bus grant signal for its read and the expansion bus bridge 219 will simultaneously be issued a corresponding slave source-data signal causing it to present its data on the data bus 205 to be sampled by the CPU 203.

As may be appreciated from the foregoing description, the data arbitration phase in accordance with the present invention is very different than in the conventional case. This different manner of operation allows address and data tenures to be decoupled, increasing utilization of the data bus.

The data transfer and data termination phases, however, are essentially the same as in the conventional case.

Transaction reordering is controlled by the arbiter 600. The basic behavior that the arbiter 600 guarantees is as follows:

Any given ARBus master has its own address and data tenures strictly ordered. That is, DBG(n) always corresponds to TS(n) and for a set of TS(n) and TS(n+1), DBG(n) will always occur before DBG(n+1).

Any given ARBus slave has its own data tenures strictly ordered. That is, SSD(n) always corresponds to TS(n) and for a set of TS(n) and TS(n+1), SSD(n) will always occur before SSD(n+1).

Data bus tenure is not necessarily granted on the ARBus in the same order as address tenure is granted if the address tenures are granted to different masters. That is, if TS(n) is for Master A and TS(n+1) is for Master B, DBG(n) may be for Master B and therefore DBG(n+1) for Master A.

In the illustrated embodiment, the arbiter 600 supports five logical masters. The five masters arbitrate for use of the bus in accordance with a fixed priority as follows: the video bus bridge 700, the expansion bus bridge 219, an additional expansion bus bridge (if present), the data processor 203, and the secondary processor 218. By giving highest priority to the video bus bridge 700, the arbiter 600 allows the video bus bridge 700 to "hog" the ARBus.

The arbiter 600 may optionally "park" the data processor 203 or the video bus bridge 700 on the ARBus by asserting the appropriate BG wire during idle bus cycles. The default mode of operation is to park the most recent master.

Transactions which do not involve a data transfer (Address-Only transactions) are typically generated by the CPU 203 or the secondary processor 218 and are simply acknowledged (AACK asserted) by the receiving slave device.

Figure 7:
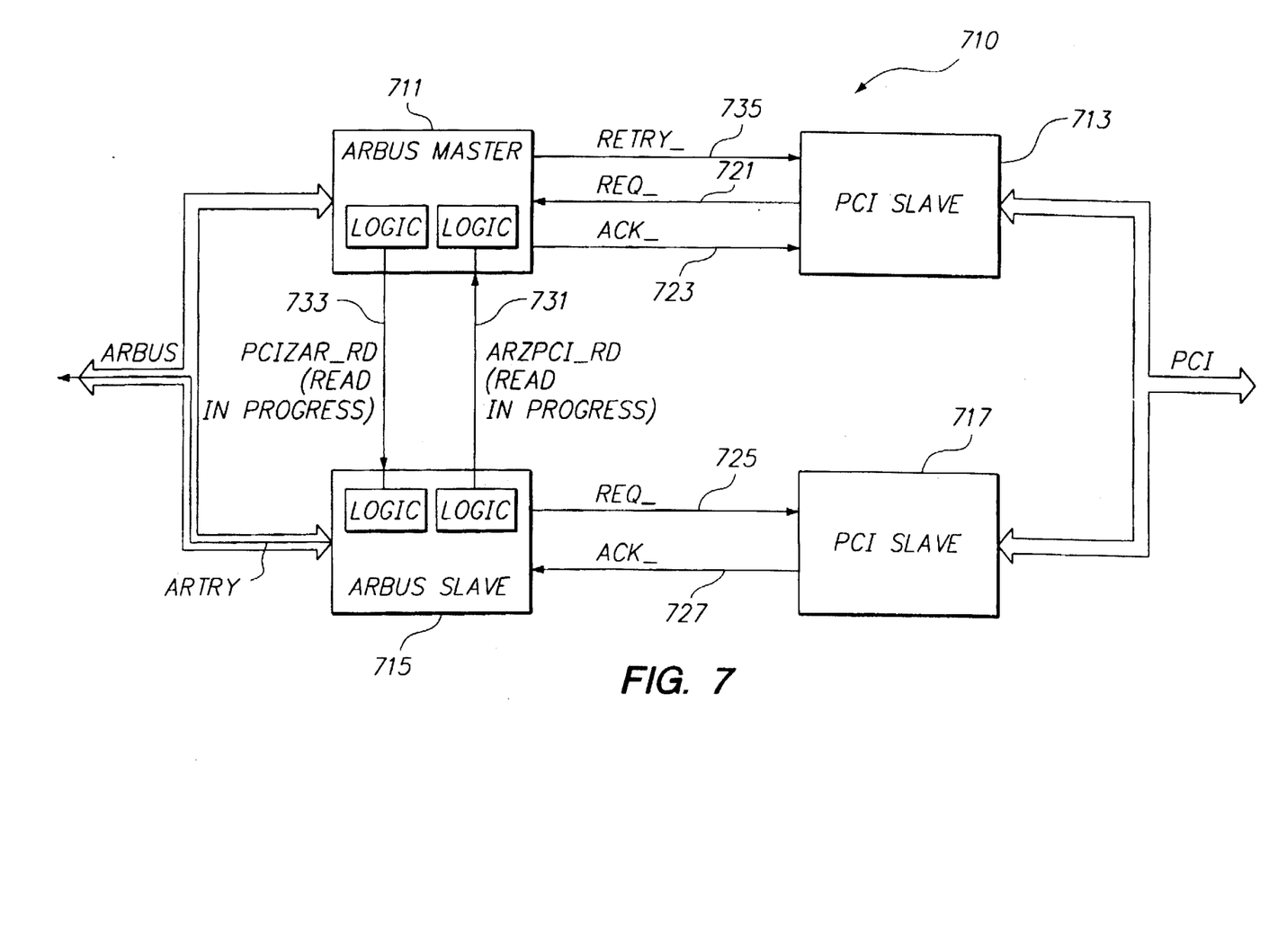
FIG. 7 is a block diagram of the video bridge 700 of FIG. 3.

Referring to FIG. 7, a control portion, or control block, 710 of the video bridge 700 will be described. A datapath portion of the video bridge 700 stores or forwards data within a video and graphics subsystem of the computer system of FIG. 2. The datapath portion of the video bridge 700 is not particularly germane to the present invention. Further details concerning the arbiter 600 and split-bus operation may be found in copending U.S. Pat. No. 5,592,631 entitled "Bus Transaction Reordering Using Side-Band Information Signals, filed concurrently herewith (Attorney's Docket No. P1605/172), incorporated herein by reference. Additional details concerning the expansion bus bridge 219 may be found in copending U.S. application Ser. No. 08/432,622 entitled "Deadlock Avoidance in a Split-Bus Computer System," filed concurrently herewith (Attorney's Docket No. P1473/134), also incorporated herein by reference.

The control block 710 handles the ARBus interfaces and the bridge function to the video PCI bus. In particular, the control block 710 supports the ARBus specification for pipelined transactions. The control block 710 provides all of the signalling necessary to arbitrate for the ARBus and transfer data.

The control block 710 receives data transfer requests from the ARBus and from the PCI video bus ("PCI bus"). Various blocks within the control block 710 facilitate transfers generated by these requestors. These blocks include an ARBus Master 711, a PCI Slave 713, an ARBus Slave 715, and a PCI Master 717. The ARBus Master 711 and the ARBus Slave 715 are connected to the ARBus, and the PCI Master 717 and the PCI Slave 713 are connected to the PCI bus. It should be note that as described above, each of the master and slave circuits, 711, 713, 715, and 717 include a FIFO structure for supporting ordered service to transactions that are posted.

In operation, the PCI Slave 713 receives accesses from the PCI and passes them to the ARBus Master 711. The ARBus Master 711 receives requests from the PCI Slave 713 via a REQ_ signal 721. When the ARBus Master 711 is prepared to service the request, it acknowledges the request via an ACK_ signal 723 and proceeds to generate ARBus Address phases. Likewise, the ARBus Slave 715 receives Address phases from the ARBus and passes them to the PCI Master 717. The PCI Master 717 receives requests from the ARBus Slave 715 via a REQ_ signal 725. When the PCI Master 717 is prepared to service the request, it acknowledges the request via an ACK_ signal 727 and proceeds to generate PCI cycles.

Figure 6:
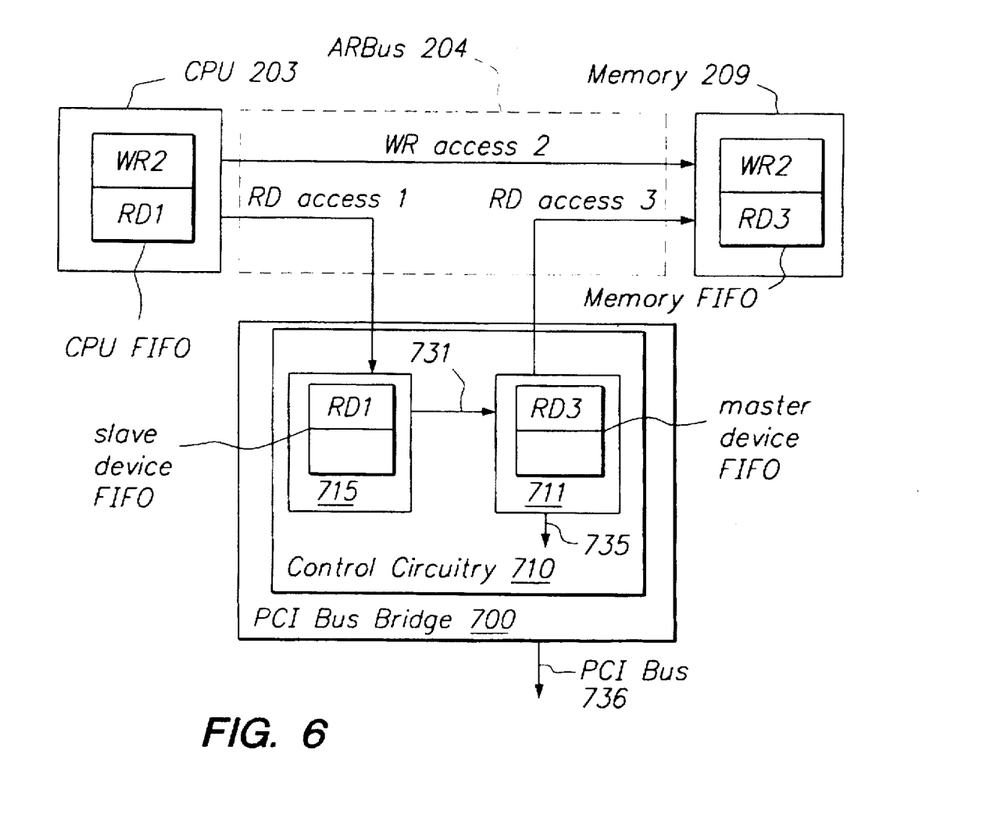
FIG. 6 illustrates a read/read deadlock.

As explained previously, systems are most prone to deadlocks and live-locks when there is a bridge in the system. In particular, in the system of FIG. 2, a Read/Read deadlock can occur when a bus master (i.e. CPU 203) on the ARBus 204 first attempts a read access (RD access 1) from the PCI bus 736 via the video bridge 700, and second enqueues a write access (WR access 2) to a second slave such that as the memory system 209, followed by another bus master (not shown) on the PCI bus 736 beginning a read access (RD access 3) from the same second slave (i.e. memory system 209) on the ARBus 204. This situation is illustrated in FIG. 6.

The ARBus master's read (RD access 1) of the PCI bus slave cannot progress, since the PCI bus is busy with the PCI bus master's read (RD access 3) of the second ARBus slave (i.e. 209). The PCI bus master's read (RD access 3) cannot progress because the ARBus master's transaction (WR access 2) to the second slave cannot complete until the ARBus master's read (RD access 1) of the PCI bus slave completes. The bus is in a Read/Read deadlock condition. No transaction can progress.

The video bridge 700 operates to avoid the Read/Read deadlock condition by disallowing the second deadlocking (RD access 3) read transaction. While there is an outstanding read transaction in either the master or slave portions of the split-response bus interface, the other portion will refuse to accept, or retry, another potentially deadlocking read transaction.

Referring again to FIG. 7, a signal 731, AR2PCI_RD, is directed from the ARBus Slave 715 to the ARBus Master 711 and signifies that a ARBus to PCI bus read is in progress. Similarly, a signal 733, PCI2AR_RD, is directed from the ARBus Master 711 to the ARBus Slave 715 and signifies that a PCI bus to ARBus read is in progress. When (and for so long as) the signal 731 is asserted, the ARBus Master 711 will refuse to accept, or retry, another potentially deadlocking read transaction, by asserting the RETRY signal to the PCI Slave 713. When (and for so long as) the signal 733 is asserted, the ARBus Slave 715 will refuse to accept, or retry, another potentially deadlocking read transaction, by asserting the ARTRY_ signal to the ARBus. As shown in FIG. 7, the ARTRY signal is one of the parallel signals transmitted on the ARBus. In this manner, the potentially deadlocking read transaction is guaranteed to be avoided.

FIG. 6 illustrates how a Read/Read deadlock condition as described above is avoided. Specifically, FIG. 6 illustrates the enqueuing of accesses within the ARBus Slave 715 and ARBus Master 711 which each reside within the PCI bridge control circuitry 710. FIG. 6 further shows the assertion of signal 731 in accordance with the method and system of the present invention. Signal 731 indicates that an ARBus to PCI bus read is in progress and causes the ARBus Master 711 to refuse to accept another potentially deadlocking read transaction, i.e. RD access 3.

The video bridge 700 of FIG. 2 has the advantage of being absolutely certain of avoiding the Read/Read deadlock condition with a minimum amount of complex circuitry.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A method of avoiding system deadlock in a computer system having a split-transaction bus and a single-envelope bus bridged by a bus bridge, at least one master device and at least one slave device being connected to said split-transaction bus, said bus bridge having a first master control circuit and a first slave control circuit for said split-transaction bus and coupled to said split transaction bus, said method comprising the steps of:

enqueuing in said first master control circuit read transactions from said single-envelope bus to said split-transaction bus;

enqueuing in said first slave control circuit read transactions from said split-transaction bus to said single-envelope bus;

in a condition when an outstanding read transaction is enqueued in one of said first master control circuit and said first slave control circuit, signaling said outstanding read transaction condition from one to the other of said first master control circuit and said first slave control circuit; and said other of said first master control circuit and said first slave control circuit, accepting some transactions but refusing to accept, from a respective one of said single-envelope bus and said split-transaction bus, a subsequent read transaction.

2. The method of claim 1, wherein said step of refusing to accept comprises issuing a retry signal in response to said subsequent read transaction.

3. The method of claim 1, wherein said signalling step comprises asserting a Read-In-Progress signal.

4. The method of claim 3, wherein said refusing step comprises refusing to accept a subsequent read transaction for so long as said Read-In-Progress signal is asserted.

5. The method of claim 1, wherein at least one master device and at least one slave device are connected to said single-envelope bus, and said bus bridge has a second master control circuit and a second slave control circuit for said single-envelope bus, said method further comprising the step of operating asynchronously with respect to said first master control circuit and said first slave control circuit.

6. A computer system comprising:

a split-transaction bus;

a single-envelope bus;

at least one master device and at least one slave device connected to said split-transaction bus;

a bus bridge bridging said split-transaction bus and said single-envelope bus, said bus bridge comprising a first slave control circuit coupled to said split transaction bus for enqueuing read transactions from said split-transaction bus and a first master control circuit coupled to said split transaction bus for enqueuing read transactions from said single-envelope bus;

means within said first master control circuit for signaling said first slave control circuit via a first signal when an outstanding read transaction is enqueued in said first master control circuit;

means within said first slave control circuit for signaling said first master control circuit via a second signal when an outstanding read transaction is enqueued in said first slave control circuit;

means within said first master control circuit and responsive to said second signal for causing said first master control circuit to accept some transactions but refuse to accept a subsequent read transaction; and means within said first slave control circuit and responsive to said first signal for causing said first slave control circuit to accept some transactions but refuse to accept a subsequent read transaction.

7. The apparatus of claim 6, further comprising at least one master device and at least one slave device connected to said single-envelope bus, said bus bridge further comprising:

a second master control circuit for said single-envelope bus; and a second slave control circuit for said single-envelope bus;

wherein said second master control circuit and said second slave control circuit are operated asynchronously to said first master control circuit and said first slave control circuit.

8. A bus bridge for bridging a split-transaction bus and a single-envelope bus, said bus bridge comprising:

a first slave control circuit coupled to said split transaction bus for enqueuing read transactions from said split-transaction bus and a first master control circuit coupled to said split transaction bus for enqueuing read transactions from said single-envelope bus;

means within said first master control circuit for signaling said first slave control circuit via a first signal when an outstanding read transaction is enqueued in said first master control circuit;

means within said first slave control circuit for signaling said second master control circuit via a second signal when an outstanding read transaction is enqueued in said first slave control circuit;

means within said first master control circuit and responsive to said first signal for causing said first master control circuit to accept some transactions but refuse to accept a subsequent read transaction; and means within said first slave control circuit and responsive to said second signal for causing said first slave control circuit to accept some transactions but refuse to accept a subsequent read transaction.

* * * * *